Figure 1:

United States Patent [19]
Rosen

[11] Patent Number: 5,248,534

[45] Date of Patent: Sep. 28, 1993

[54] PACKAGING MATERIAL AND ALSO USE OF THE MATERIAL FOR MANUFACTURE OF CONTAINERS WITH GOOD OXYGEN-TIGHT PROPERTIES

[75] Inventor: Ake Rosen, Helsingborg, Sweden

[73] Assignee: Tetra Alfa Holdings SA, Pully, Switzerland

[21] Appl. No.: 818,156

[22] Filed: Jan. 8, 1992

[30] Foreign Application Priority Data

Jan. 9, 1991 [CH] Switzerland ............... 9100057

[51] Int. Cl.⁵ ............................................. B29D 22/00
[52] U.S. Cl. ....................... 428/36.7; 156/244.11; 428/402; 428/516; 428/520
[58] Field of Search ............ 428/516, 402, 36.7, 428/520

[56] References Cited

U.S. PATENT DOCUMENTS

| 4,579,784 | 4/1986 | Lemstra et al. ............ 428/516 |
| 4,948,665 | 8/1990 | Rosen ............................ 428/332 |

FOREIGN PATENT DOCUMENTS

| 0132565 | 2/1985 | European Pat. Off. . |
| 204324 | 12/1986 | European Pat. Off. . |
| 353496 | 2/1990 | European Pat. Off. . |
| 353991 | 2/1990 | European Pat. Off. . |
| 0407880A2 | 1/1991 | European Pat. Off. . |
| 1409958 | 10/1975 | United Kingdom . |
| 1521568 | 10/1975 | United Kingdom . |
| WO89/02859 | 4/1989 | World Int. Prop. O. . |

*Primary Examiner*—Edith Buffalow
*Attorney, Agent, or Firm*—Burns, Doane, Swecker & Mathis

[57] ABSTRACT

Packaging material for shaping into form stable liquid-tight containers with good oxygen-tight properties through fold forming, thermo-forming or other mechanical processing for shaping of the material.

The packaging material (10) comprises a skeletal layer (11) and a barrier layer (12) attached to the skeletal layer with good adhesion. The skeletal layer (11) is composed of a mixture of plastic, preferably polyolefine, and filler to an amount of between 50 and 80% of the total weight of the mixture, and the barrier layer (12) is composed of a plastic material comprising plastic of the same type as the plastic in the skeletal layer (11), preferably polyolefine, in a mixture with plastic of another type than the one mentioned.

The plastic of the aforesaid other type in the barrier layer (12) can be an ethylene/vinyl alcohol copolymer, polyvinylidene chloride, polyamide or similar plastic with good oxygen-tight properties, preferably an ethylene/vinyl alcohol copolymer to an amount of 40% or more of the total weight of the barrier layer.

31 Claims, 1 Drawing Sheet

PACKAGING MATERIAL AND ALSO USE OF THE MATERIAL FOR MANUFACTURE OF CONTAINERS WITH GOOD OXYGEN-TIGHT PROPERTIES

The present invention concerns a flexible packaging material in the form of a sheet or strip for shaping into form-stable liquid-tight containers with good oxygen-tight properties through fold forming, thermo-forming or other mechanical processing for shaping of the material, with this material having a stiffening skeletal layer composed of a mixture of plastic and filler, and also a barrier layer attached to one side of the skeletal layer with good adhesion.

In addition the invention concerns the use of the packaging material for manufacture of form-stable liquid-tight containers with good oxygen-tight properties through fold forming, thermo-forming or other mechanical processing for shaping of the material.

A packaging material of the type which is described above is known through, for example, EP-A-0 353 991. A similar packaging material is also described in EP-A-0 353 496.

The known packaging material according to EP-A-0 353 991 comprises a stiffening skeletal layer composed of a mixture of either a propylene homopolymer with a melting index of under 10 according to ASTM (2.16 kg; 230° C.) and filler to an amount of between 50 and 80% of the total weight of the mixture, or of an ethylene/propylene copolymer with a melting index of between 0.5 and 5 according to ASTM (2.16 kg; 230° C.) and filler to an amount of between 50 and 80% of the total weight of the mixture, and also a layer of a material with good gas barrier properties attached to one side of the skeletal layer with good adhesion. As an individual example of such a gas barrier layer Al foil is mentioned, which is attached to the skeletal layer with the aid of a sealing layer of suitable character between them.

A problem with the known packaging material is that an Al foil, as is known, is very expensive and therefore inevitably entails high costs for production of the packaging material. An Al foil is furthermore very sensitive to tension and in practice completely inelastic and therefore breaks easily when the material is subjected to powerful tension and flexion stresses during the shaping of the material into containers. In addition according to the requirements of the authorities an Al foil which is to be used in a packaging material for containers for contents of the liquid foods type must be covered with at least one outer protective layer in order to prevent direct contact between the Al foil and the contents of the container produced, which contributes to further increasing the manufacturing costs of the material at the same time as it gives the material an unnecessarily complicated structure.

Another known packaging matreial of the type which is described above comprises a stiffening skeletal layer likewise composed of a mixture of either a propylene homopolymer with a melting index of under 10 according to ASTM (2.16 kg; 230° C.) and filler to an amount of between 50 and 80% of the total weight of the mixture or of an ethylene/propylene copolymer with a melting index of between 0.5 and 5 according to ASTM (2.16 kg; 230° C.) and filler to an amount of between 50 and 80% of the total weight of the mixture, and also a homogeneous gas barrier layer of an ethylene/vinyl alcohol copolymer (EVOH) attached to one side of the skeletal layer. Since the oxygen permeability of the barrier layer is largely dependent on the barrier layer's moisture content and increases with increasing moisture contents, the known packaging material has an outer layer of plastic attached to the barrier layer, which gives the underlying barrier layer protection against the action of moisture. The skeletal layer also has an outer layer of plastic, which is preferably of the same type as the plastic in the first mentioned outer plastic layer.

This known packaging material has the advantage over the previously described known packaging material that instead of an expensive, tension-sensitive Al foil it uses a relatively cheaper ethylene/vinyl alcohol copolymer as material in the barrier layer, but it has like the previous packaging material a complicated material structure containing several different individual layers of material. The material structure is further complicated by the fact that the barrier layer of EVOH cannot be attached directly to the two surrounding layers (the skeletal layer and the moisture-protection outer plastic layer), but requires one or more intermediate binder layers in order to give the packaging material the desired good adhesion between the individual layers of material.

An aim of the present invention is therefore to give indications of a packaging material of the type described in the introduction, without resultant problems of the type inherent in the known packaging materials.

This and other aims and advantages are achieved according to the invention through the fact that the packaging material has been given the characteristic that the barrier layer is composed of a mixture of plastic of the same type as the plastic in the skeletal layer and a plastic of another type than the one mentioned.

Through the fact that the barrier layer contains the same plastic as the skeletal layer these two layers can be attached directly to each other with extraordinarily good adhesion without the use of any separate intermediate binding or sealing layer as in the known technologies. In addition the advantage is gained over the known packaging materials that the packaging material according to the invention is what is known as a homogeneous material, i.e. a material with in all essentials the same plastic in all material layers forming part of the material, which makes the material reusable and very attractive from the production point of view. Through its easy reusability the packaging material is in addition extremely valuable from the environmental standpoint.

According to a specially advantageous embodiment of the invention the barrier layer is composed of a mixture of either 40–80 weight % EVOH and 60–20 weight % of a propylene homopolymer or an ethylene/propylene copolymer of the type described above, while the skeletal layer is composed of the same propylene homopolymer and between 50 and 80 weight % filler or of the same ethylene/propylene copolymer and between 50 and 80 weight % filler. Preferably the amount of EVOH in the barrier layer should be about 50%, which gives the barrier layer an oxygen-tightness almost in the same class as an Al foil, with the use of the minimum possible amount of EVOH, as will be explained.

Further practical and advantageous embodiments of the invention have further been given the characteristics stated in the sub-claims.

Figure 2:
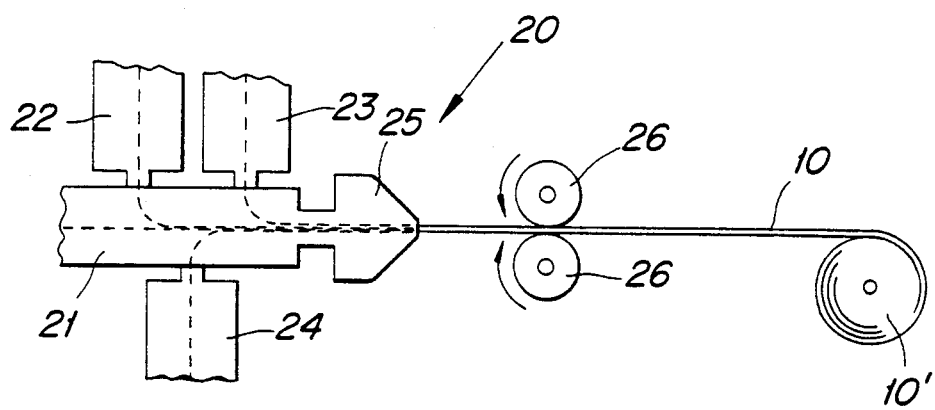
Figure 3:
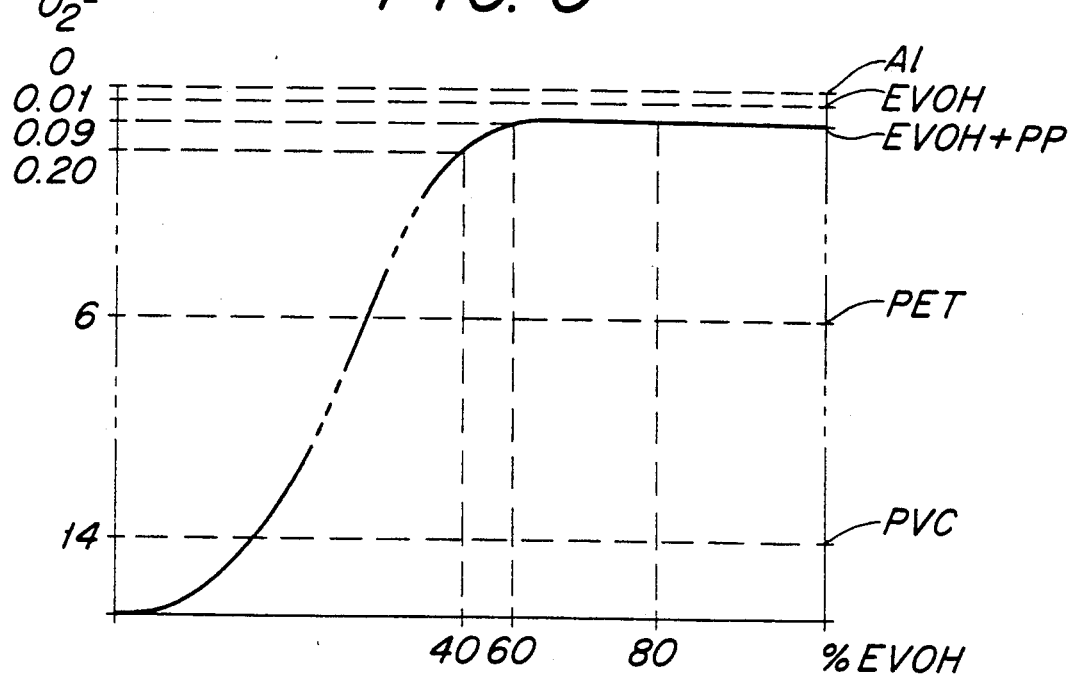

The invention will now be described and explained in greater detail with particular reference to the enclosed drawings in which FIG. 1 shows schematically a cross section of a packaging material according to a preferred embodiment of the invention, FIG. 2 explains schematically the manufacture of the packaging material in FIG. 1, and FIG. 3 is a graph which shows schematically how the oxygen permeability ($O_2$ perm.) of the barrier layer varies with the proportion of EVOH in the barrier layer.

The packaging material according to the invention, which may be in the form of a sheet or strip, has been given the general reference designation 10 in FIG. 1. The material 10 has a stiffening skeletal layer 11 composed of a mixture of plastic and filler, and also a barrier layer 12 composed of a mixture of plastic of the same type as the plastic in the skeletal layer 11 and a plastic of another type than the one mentioned, attached to the skeletal layer 11 with good adhesion.

The barrier layer 12, which is preferably attached to the skeletal layer 11 through surface fusion of the plastic of the aforesaid same type in the respective layers, may have an outer layer 13 of plastic of the aforesaid same type. The skeletal layer 11 may have an outer layer 14 composed of plastic of the same type as in the first-mentioned outer layer 13. The two outer layers 13 and 14 are preferably also attached to the respective neighbouring layers through surface fusion of the plastic of the aforesaid same type in order to ensure good adhesion between all layers of material forming part of the material 10.

The plastic in the skeletal layer 11 is preferably a polyolefin plastic such as polythene, polypropylene, etc., but is preferably composed of a propylene homopolymer with a melting index of under 10 according to ASTM (2.16 kg; 230° C.) or an ethylene/propylene copolymer with a melting index of between 0.5 and 5 according to ASTM (2.16 kg; 230° C.). Of these two preferred polyolefin plastics ethylene/propylene copolymer with the aforesaid melting index is the most preferred, since it retains its excellent sealing and mechanical strength properties even at low temperatures, 8° C. or lower.

The filler in the skeletal layer 11 can be any known filler in the field such as granular or flaked chalk, talc, mica, clay etc. The preferred filler is, however, chalk. The amount of filler in the skeletal layer is 50–80% of the total weight of the skeletal layer, preferably c. 65 weight %.

The barrier layer 12 is composed, as stated, of a mixture of plastic of the same type as the plastic in the skeletal layer 11 and a plastic of another type. The plastic of the aforesaid same type is thus preferably a polyolefin plastic such as polythene, polypropylene etc., but preferably a polypropylene plastic. The preferred polypropylene plastic is either a propylene homopolymer with a melting index of under 10 according to ASTM (2.16 kg; 230° C.) or an ethylene/propylene copolymer with a melting index of between 0.5 and 5 according to ASTM (2.16 kg; 230° C.). For the same reason as above, however, an ethylene/propylene copolymer with a melting index in the range mentioned is preferred. The other plastic component in the barrier layer 12 can for example be an ethylene/vinyl alcohol copolymer (EVOH), polyvinylidene chloride (PVDC), polyamide (PA) or a similar polymer with good gas barrier properties, but preferably an ethylene/vinyl alcohol copolymer (EVOH). The anmount of this second plastic component in the barrier layer 12 can vary within wide limits, but is generally situated within the area 40–80% of the total weight of the barrier layer. A barrier layer composed of c. 40 weight % ethylene/vinyl alcohol copolymer (EVOH) and c. 60 weight % of an ethylene/propylene copolymer with a melting index within the region of 5–10 according to ASTM in combination with a skeletal layer 11 composed of a mixture of the same ethylene/propylene copolymer and between 50 and 80 weight % filler has in practice proved to be able to give a packaging material with oxygen-tight properties easily on a par with an Al foil, as will be explained in greater detail with particular reference to FIG. 3.

The two outer layers 13 and 14 are also preferably composed of a polyolefin plastic such as polythene, polypropylene etc., preferably a polypropylene plastic which may be either a propylene homopolymer with a melting index of under 10 according to ASTM (2.16 kg; 230° C.) or an ethylene/propylene copolymer with a melting index of between 0.5 and 5 according to ASTM (2.16 kg; 230° C.). Preferably the two outer layers are composed of an ethylene/propylene copolymer with a melting index within the range mentioned for reasons which are explained above.

As can be seen from FIG. 1 the material layers forming part of the material 10 have different material thicknesses, where the thickness of the skeletal layer 11 can be between 150 and 1400 μm, the barrier layer can have a thickness of between 5 and 50 μm and the two outer layers 13 and 14 can have a thickness of between 5 and 50 μm. The thickness of the skeletal layer 11 is preferably situated in the upper part of the thickness range mentioned if the material 10 is to be shaped into a container through thermo-forming or other mechanical processing for shaping, while the thickness is preferably situated in the lower part of the range if the material is to be shaped into a container through fold forming.

FIG. 3 shows a graph which schematically explains how the oxygen permeability of the barrier layer 12 varies with the proportion (weight %) of EVOH in the barrier layer. The vertical axis in the graph represents the oxygen permeability ($O_2$ perm.) while the horizontal axis represents the proportion of EVOH (% EVOH) in the barrier layer. On the right-hand vertical axis there are shown the relative oxygen permeabilities for a number of conventional oxygen barrier materials in the field including Al foil (Al), ethylene/vinyl alcohol copolymer (EVOH), polyethylene terephthalate (PET) and polyvinyl chloride (PVC). Of these known barrier materials Al foil has the lowest oxygen permeability, which in the graph is made equal to 0. Then comes EVOH with a corresponding oxygen permeability of c. 0.01, while the two other barrier materials have corresponding oxygen permeability values of c. 6 (PET) and c. 14 (PVC) respectively.

The oxygen permeability for the barrier layer according to the invention varies along a S-shaped curve from a value higher than 14 (with 0% EVOH) to a value of c. 0.09 (with c. 60% EVOH) which with proportions of EVOH increasing beyond this remains practically constant at this level, i.e. c. 0.09.

In order to give the best possible oxygen-tightness in the material according to the invention, the proportion of EVOH in the barrier layer should thus be c. 50 weight %, at which the barrier layer exhibits the best possible oxygen-tight properties with the use of the minimum possible proportion of EVOH. Acceptable oxygen-tight properties are, however, already achieved with proportions of EVOH of c. 40 weight %, which gives an oxygen barrier better than the oxygen permeability for polyethylene terephthalate (PET). In practice therefore the EVOH content should be c. 40-80 weight %, but preferably c. 50 weight %.

The material 10 according to the invention can be manufactured by extrusion of all layers of material forming part of the material, but is preferably manufactured by co-extrusion with the use of a device of the type which is shown schematically in FIG. 2. The device with the general reference designation 20 contains 4 extruders coupled together 21, 22, 23 and 24 with a common orifice head 25, and also a cylinder or roller arrangement placed in front of the orifice head, containing cooled cylinders or rollers 26 rotating in the direction of the arrows.

Through the central extruder 21 melted output material for the skeletal layer 11 is propelled forward, i.e. a mixture of the chosen plastic and filler to an amount of between 50 and 80% of the total weight of the mixture, while the extruders 22 and 23 propel forward melted output material for the barrier layer 12, i.e. a mixture of the same plastic as in the skeletal layer and a plastic of another type, and melted output material for the outer layer 13, i.e. plastic of the type chosen for the skeletal layer, respectively. The extruder 25 propels forward melted output material for the outer layer 14, i.e. plastic of the type chosen for the skeletal layer. The four flows of melted material indicated with dotted lines are pressed through the slot-shaped opening of the orifice head 25 and taken jointly with each other through the pinch between the contra-rotating press cylinders or rollers 26 for cooling and durable joining together of the layers of material through surface fusion of the plastic of the aforesaid same type in the respective neighbouring layers of material to form the finished packaging material 10 in strip form. The packaging material 10 can then be wound on to a supply roller 10'.

In accordance with the present invention it is thus possible in a simple manner with the use of already existing technology and equipment to produce packaging material in the form of a sheet or strip which exhibits good binding strength between all the layers of material forming part of the material and which has oxygen-tight properties in the same class as a conventional packaging material containing an Al foil as a barrier layer. The packaging material is in addition easy to recover and reuse, since all layers of material contain plastic of the same type, which entails that the material can be shaped into containers with the least possible waste of material, whether the material is shaped through fold forming, thermo-forming or other mechanical processing for shaping.

Even if the invention has been described with particular reference to a single embodiment shown as a preferred example, it should be observed that several modifications obvious for the specialists are possible within the framework of the idea of the invention as defined by the patent claims that follow.

I claim:

1. A flexible packaging material comprising:
a stiffening skeletal layer having an inner side and an outer side, said skeletal layer being composed of a mixture of plastic and filler, and
a barrier layer bonded to the inner side of the stiffening skeletal layer, said barrier layer being composed of a mixture containing an ethylene/vinyl alcohol copolymer and a plastic of the same type as the plastic in the stiffening skeletal layer, wherein the amount of ethylene/vinyl alcohol copolymer in the barrier layer is at least 40% of the total weight of the mixture.

2. The flexible packaging material of claim 1 wherein the flexible packaging material is in the form of a sheet or strip.

3. The flexible packaging material according to claim 1 wherein the barrier layer is bonded to the stiffening skeletal layer through surface fusion of the plastic of the same time in the barrier layer and skeletal layer.

4. The flexible packaging material of claim 1 wherein the barrier layer and the stiffening skeletal layer are manufactured by extrusion.

5. The packaging material of claim 1 wherein the barrier layer and the stiffening skeletal layer are manufactured by co-extrusion.

6. The flexible packaging material of claim 1 further comprising an outer layer adjacent to the barrier layer, said outer layer containing plastic of the same type as in the stiffening skeletal layer.

7. The flexible packaging material according to claim 6 further comprising a second outer layer on the outer surface of the stiffening skeletal layer said second outer layer containing plastic of the type as in the skeletal layer.

8. The flexible packaging material according to claim 7 wherein the outer layer is attached to the barrier layer through surface fusion of the plastic in the barrier layer and the outer layer.

9. The flexible packaging material of claim 8 wherein the second outer layer is attached to the stiffening skeletal layer through surface fusion of the plastic of the same type in the second outer layer and the stiffening skeletal layer.

10. The flexible packaging material of claim 6 wherein the outer layer is manufactured through extrusion.

11. The flexible packaging material according to claim 7 wherein the second outer layer is manufactured through extrusion.

12. The flexible packaging material of claim 6 wherein the outer layer and the second outer layer are manufactured through co-extrusion together with the barrier layer and the stiffening skeletal layer.

13. The flexible packaging material of claim 1 wherein the filler in the stiffening skeletal layer is selected from the group consisting of powdered, granular and flaked chalk, talc mica, clay or a combination thereof.

14. The flexible packaging material of claim 1 wherein the filler in the stiffening skeletal layer is between 50 and 80% of the total weight of the mixture.

15. The flexible packaging material according to claim 1 wherein the barrier layer has a thickness of between 5 and 50 μm.

16. A flexible packaging material comprising:
a stiffening skeletal layer having an inner side and an outer side, said skeletal layer being composed of a mixture of plastic and filler, and
a barrier layer bonded to the inner side of the stiffening skeletal layer, said barrier layer being composed of a mixture containing an ethylene/vinyl alcohol copolymer and a plastic of the same type as the plastic in the skeletal layer,
wherein the amount of ethylene/vinyl alcohol copolymer in the barrier layer is at least 40% of the total weight of the mixture and the plastic of the same type in the barrier layer and the stiffening skeletal layer is a propylene homopolymer or ethylene/propylene copolymer.

17. The flexible packaging material of claim 16 wherein the filler in the stiffening skeletal layer is selected from the group consisting of powdered, granular and flaked chalk, talc, mica, clay or a combination thereof.

18. The flexible packaging material of claim 17 wherein the filler in the stiffening layer is between 50 and 80% of the total weight of the mixture.

19. The flexible packaging material of claim 16 further comprising an outer layer adjacent to the barrier layer, said outer layer containing plastic of the same type as in the stiffening skeletal layer.

20. The flexible packaging material of claim 19 further comprising a second outer layer on the outer surface of the stiffening skeletal layer, said second outer layer containing plastic of the type as in the skeletal layer.

21. The flexible packaging material of claim 20, wherein the outer layer is attached to the barrier layer through surface fusion of the plastic of the same type in the barrier layer and the outer layer and the second outer layer is attached to the stiffening skeletal layer through surface fusion of the plastic of the same type in the second outer layer and the stiffening skeletal layer.

22. The flexible packaging material of claim 16 wherein the barrier layer has a thickness of between 5 and 50 μm.

23. The flexible packaging material of claim 16 wherein the plastic in the skeletal layer includes a propylene homopolymer.

24. The flexible packaging material of claim 16 wherein the plastic in the skeletal layer is from the group consisting of a propylene homopolymer and an ethylene/propylene copolymer and the plastic in the barrier layer is from the group consisting of a propylene homopolymer and an ethylene/propylene copolymer.

25. A container having a wall for enclosing the contents of the container, the improvement comprising a flexible wall having a stiffening skeletal layer having an inner side and an outer side, said skeletal layer being composed of a mixture of plastic and filler, and a barrier layer bonded to the inner side of the stiffening skeletal layer, said barrier layer being composed of a mixture containing an ethylene/vinyl alcohol copolymer and a plastic of the same type as the plastic in the skeletal layer, wherein the amount of ethylene/vinyl alcohol copolymer in the barrier layer is at least 40% of the total weight of the mixture.

26. The container according to claim 25 wherein the plastic of the same type in the barrier layer and the skeletal layer is a propylene homopolymer or an ethylene/propylene copolymer.

27. The container according to claim 25 wherein the filler in the skeletal layer is selected from the group consisting of powdered, granular and flaked chalk, talc, mica, clay or a combination thereof.

28. The container according to claim 25 wherein the plastic of another type in the barrier layer is an ethylene/vinyl alcohol copolymer.

29. A process for the manufacture of a form-stable, liquid-tight container comprising:
making a flexible packaging material having a stiffening skeletal layer with an inner side and an outer side and a barrier layer on the inner side of the stiffening skeletal layer, said skeletal layer containing a mixture of plastic and filler and said barrier layer containing a mixture of an ethylene/vinyl alcohol copolymer and a plastic of the same type used in the stiffening skeletal layer, wherein the amount of ethylene/vinyl alcohol copolymer in the barrier layer is at least 40% of the total weight of the mixture, and
mechanically forming the flexible packaging material into a container.

30. The process of claim 29 wherein the flexible packaging material includes a first outer layer adjacent to the barrier layer composed of plastic of the same type used in the skeletal layer and a second outer layer adjacent to the outer side of the stiffening skeletal layer composed of the same plastic used in the skeletal layer.

31. The process of claim 29 wherein the mechanically forming step includes fold-forming or thermo-forming.

* * * * *